United States Patent [19]

Hait

[11] 4,126,705
[45] Nov. 21, 1978

[54] PROCESS FOR MAKING A DEHYDRATED PROTEIN SNACK FOOD

[75] Inventor: Paul W. Hait, Saratoga, Calif.

[73] Assignee: Aroma Taste, Inc., Sunnyvale, Calif.

[21] Appl. No.: 851,674

[22] Filed: Nov. 15, 1977

Related U.S. Application Data

[63] Continuation of Ser. No. 712,740, Aug. 9, 1976, abandoned, which is a continuation of Ser. No. 544,399, Jan. 27, 1975, abandoned.

[51] Int. Cl.$^2$ .............................................. A23B 4/04
[52] U.S. Cl. .................................. 426/314; 426/315; 426/641; 426/643; 426/644; 426/656
[58] Field of Search ............... 426/314, 315, 641, 643, 426/644, 646, 647, 656, 657, 486, 515, 518

[56] References Cited

U.S. PATENT DOCUMENTS

| 2,439,180 | 4/1948 | McKee et al. | 426/315 X |
| 2,461,291 | 2/1949 | McKee | 426/315 |
| 2,641,544 | 6/1953 | Parker | 426/315 |
| 3,108,883 | 10/1963 | Goeser | 426/518 |
| 3,241,982 | 3/1966 | Shank | 426/641 X |
| 3,432,311 | 3/1969 | Gruner | 426/641 X |

Primary Examiner—R. B. Penland
Attorney, Agent, or Firm—W. W. Ritt, Jr.

[57] ABSTRACT

A process for preparing a tender, tasty, dehydrated protein snack food from protein material such as raw meat, poultry, fish, vegetable protein, and all mixtures thereof. The process involves the sequential steps of preparing thin slices of the protein material, intimately exposing these slices to a flavoring composition, eliminating entrapped air from the protein material to compact it and thoroughly impregnate it with the flavoring composition, maintaining the protein material at a temperature above freezing for a time sufficient for it to absorb the flavoring, freezing the flavored protein material, slicing the frozen, flavored protein material, and then dehydrating the flavored protein material slices to reduce their moisture content to an acceptable level. When this process is carried out on animal protein such as meat, poultry, fish, or combinations thereof, a curing composition is added with the flavoring composition to permit a higher moisture level with lower salt content in the final product. If desired, a smoky flavor can be imparted to the product by subjecting the protein material to natural smoke, or by including a liquid smoke in the flavoring composition.

19 Claims, No Drawings

PROCESS FOR MAKING A DEHYDRATED PROTEIN SNACK FOOD

This is a continuation of application Ser. No. 712,740, filed Aug. 9, 1976, which is a continuation of application Ser. No. 544,399, filed Jan. 27, 1975, both abandoned.

BACKGROUND OF THE INVENTION

This invention relates to protein preservation, and more particularly to the conversion of protein from raw meat, poultry, fish, and vegetables into a dehydrated snack food.

Traditional methods of converting raw beef and other animal meat into a dried edible product that is stable against spoilage for long periods of time, generally involve seasoning the raw meat and then dehydrating it to a very low moisture content. One of these methods comprises vat curing the meat in a tank of brine to which spices and other seasonings have been added. One of the problems with this vat cure method is that the spices sink to the bottom of the tank, thereby establishing a stratified solution and uneven flavoring of the meat. Furthermore, the very high cost of sufficient aromatic spices required to produce adequate flavor by this method makes it uneconomical. Yet another disadvantage of this method is that the brine leaches the blood, which is a desired natural flavoring, out of the meat, thereby resulting in a less flavorful product and one that is of poor color.

Another well known curing method is to apply salt, pepper, etc. to the meat by hand, and then age it for a period of time. This method is not as costly as the aforementioned vat cure, but the salt and other seasonings penetrate the meat poorly and unevenly, resulting in a non-uniform cure. In order to increase the penetration of those ingredients, the meat is sometimes ground up before application of the flavorings. However, the product resulting from this process has an undesirable odor, appearance, and flavor.

SUMMARY OF THE INVENTION

The present invention involves a new and improved process for converting protein material such as raw meat, poultry, fish, vegetable protein, and all mixtures thereof, into a dehydrated snack food that is superior in texture, aroma, taste, color, appearance, and chewability as compared with similar products of this type. This inventive process generally comprises cutting the protein material, while in a frozen state, into thin slices, thawing these slices, then placing these slices and desired flavorings, along with a curing composition when processing animal protein, into a tumbler or similar apparatus that will impart the proper movement thereto, tumbling the slices and the flavoring composition until a thorough mixture is achieved, placing this mixture into meat lugs or other suitable containers and then tamping, vibrating, or subjecting it to a vacuum to compact it and remove entrapped air such that the flavoring composition is thoroughly impregnated into the protein material, maintaining the mixture at a temperature above freezing to complete the flavoring, and then freezing the flavored protein material.

Continuing the process, the frozen flavored protein material is sliced, preferably into thin sections, and then smoked if desired. The sections then are dehydrated to reduce their moisture content, and subsequently cut into sticks, rectangular pieces, bits or whatever form is desired for packaging. The resulting product is moist, tender, easy to chew, has a uniform texture, outstanding aroma and taste, and is attractive in appearance.

Accordingly, one object of the present invention is to provide a new process for converting meat, poulty, fish, vegetable protein, and all mixtures thereof, into a dehydrated snack food.

Another object of the present invention is to provide a novel process for the manufacture of a dehydrated protein snack food that is markedly superior to similar products in aroma, taste, color, texture, appearance and tenderness.

Further objects and advantages of my invention will become apparent to those skilled in this art from the following description.

DESCRIPTION OF THE PREFERRED EMBODIMENTS

Considered broadly, my invention comprises a novel series of procedural steps involving preparing the raw protein material in a certain way for subsequent treatment, flavoring the raw protein material in a novel manner, and dehydrating the flavored protein material to a selected moisture content, thereby resulting in a delicious protein snack food that is stable against deterioration for extended periods of time, even in the absence of refrigeration.

As carried out with animal protein, such as for example raw beef, venison, buffalo, poultry, fish and mixtures thereof, the initial step of my process involves slicing the protein material, while in a frozen condition, into slices ranging in thickness from about 1/16 to ½ inch. The thinner the slice the more natural is the grain in the product, and the quicker and more uniform is the penetration of the flavorings and curing composition. The protein material preferably is lean and otherwise of select quality, and is in block form at a temperature of about 20° to 31° F. at the time it is sliced. A slicer known in the industry as a Betcher Cleaver can be used in this step, although other devices that will function in the desired manner are also satisfactory for this purpose.

The frozen slices of protein material are then thawed by convenient means, thereby preparing them for acceptance of the flavorings and curing composition.

The selected flavorings, which can include a liquid smoke, and a curing composition are introduced into a tumbling-type mixer, those in liquid form preferably being introduced first so that the liquid coats the mixer surfaces and prevents adhesion of the protein material to these surfaces. The thawed slices, plus whatever blood and "juices" separated therefrom during thawing, are then placed in the mixer while it is in motion, and tumbling is continued until uniform distribution of the flavorings and curing composition of the protein material is achieved.

It should be understood that the process of this invention is not limited to the use of specific spices, seasonings, flavorings, or curing compositions, but that various types and combinations of these materials can be employed in the process, and that the selection thereof is but a matter of choice.

With respect to beef, venison, buffalo, and other red meat, blood is a desirable component of the final product of this inventive process, for it imparts some color and also helps to maintain the product's flavor and nutritional characteristics. Accordingly, one of the advantages of this process is that whatever "blood" that was lost during thawing is recombined with the meat.

Therefore, the produce produced by the process of this invention contains essentially all the blood originally in the raw meat, whereas this blood is lost in the liquid that is discarded as waste from other processes such as the aforementioned vat curing method.

The mixture of protein material, flavorings, and curing composition is then removed from the tumbler, placed into meat lugs or other suitable containers, and then tamped, vibrated, or subjected to a vacuum to compact the mixture and remove the entrapped air. The exclusion of air is important in order to avoid oxidation of the protein material, and to achieve a product with natural visual characteristics and a consistent, uniform flavor.

This mixture of protein material, flavorings, and curing composition is maintained at a temperature above freezing until the protein material has been cured satisfactorily, and the flavorings have thoroughly penetrated.

At the completion of the preceding step, the flavored and cured protein material is frozen into a rigid form. One way this can be achieved satisfactorily is by placing the protein material in a freezer at 0° to 15° F. until the product is sufficiently rigid to permit accurate and uniform thickness slicing. This step slows the curing cycle, and stabilizes its pH, preferably within a range of about 5.0 to 6.5. In this condition, the flavored and cured protein material can be stored for months without depreciation.

When it is desired to continue the process, the frozen blocks of flavored and cured protein material are sliced into sections of a thickness depending upon the desired thickness of the final product. As these sections come off the slicer they can be processed immediately, or they can be held in a frozen state for further processing at a later time.

If a smoke flavoring was not included in the flavoring composition, and yet a product with a smoky flavor is desired, the frozen slabs of flavored and cured protein material next are placed in a smoke house or other suitable enclosure and subjected to a smoke atmosphere for a time sufficient to impart the desired smoky flavor to the protein material. Any type of wood can be used in this smoking step. Likewise, the temperature at which the smoking is conducted is a matter of choice. During this smoking step the flavored and cured protein material thaws, the protein material and whatever "liquid material" is present jell together, and the individual pieces of protein material adhere to each other so that they resemble the grain structure of the raw protein material in its natural state.

To complete the process, the flavored and cured protein material, either smoked or otherwise, is dehydrated at a suitable temperature, such as between about 140° to 400° F., for a period of time adequate to reduce the protein material's moisture content to a desired level, such as a range of about 10 to 35 percent, with 30 to 33 percent being preferred. The final result is a dehydrated protein snack food product that can be cut into any form desired, such as sticks, strips, rectangular pieces, or small bits, and then suitably packaged.

When the process of this invention is carried out with vegetable protein, the steps are the same as set forth above with respect to animal protein, but the curing composition is omitted. When the product will contain a mixture of animal and vegetable protein, the animal protein is processed with a curing composition, and then mixed with the processed vegetable protein which contains no cure.

EXAMPLE

The following is a description of the process of this invention as employed to manufacture a dehydrated beef snack food on a commercial scale.

Three hundred pounds of 100 percent visual lean, denuded, deveined, deseamed, deboned, and frozen beef rounds, with no outside fat or sinew, and no internal marbling, bulk packed in 60 lb. (net weight) cartons of approximately 6 × 13 by 21 inches in size, are tempered to a range of 26°–28° F., in a controlled temperature room. The tempered beef is then sliced into uniform slices of approximately ¼ inch in thickness, and then thawed, during which its temperature is allowed to rise to between 35° and 45° F.

Pre-measured units of flavorings and meat cure are introduced into a tumbling-type mixer, the liquid components first in order to thoroughly coat the internal surface of the mixer, and to get uniform dispersion of the flavoring and curing composition. The thawed beef is then placed in the mixer, and all components are then tumbled adequately for uniform mixing.

The resulting mixture of beef slices, flavorings, and meat cure is removed from the mixer, and placed into containers. Each container is then subjected to a vacuum for a period sufficient to purge the meat of entrapped air and improve the flavor penetration. The vacuum is then released. The mixture is then held a sufficient time above freezing to flavor and cure it, and then is frozen to slow the curing cycle and stabilize the pH.

The frozen, flavored, and cured meat is then sliced into rectangular-shaped uniform sections of substantially ⅛ inch in thickness. These frozen sections are spread onto drying screens supported by carts, and the carts then wheeled into a smokehouse fed by smoke generators using hickory sawdust. Because of their uniform shape and size, these sections are easy to handle, and they provide a maximum packing factor, i.e., they facilitate a greater concentration of material in a given space. This greatly reduces the labor time involved in preparing the sections for the next processing step.

When adequate smoking has been achieved, such as at the end of 3 hours, the carts are placed in ovens and the flavored, cured and smoked meat is dehydrated at about 200° F., until it has a moisture content of 30 to 33 percent.

At the completion of the dehydrating step, the sections of dehydrated, flavored and cured meat are rigid and easy to handle, and can be readily removed from the drying screens. These sections then can be cut into small snack pieces, or can be bagged and stored for later cutting and packaging.

The foregoing process results in a tender, relatively moist, easy-to-eat dehydrated beef snack food that has a delightful aroma, taste, pleasing color, and uniform texture.

As will be appreciated by those skilled in this art, the process of my present invention has several advantages over those processes already known. My process results in a more uniformly flavored protein product that has a superior aroma, taste, and natural appearance, and which is easier to eat, as opposed to tough, stringy vat cured products or leathery ground products.

Although the best mode contemplated for carrying out the present invention has been herein described, it will be apparent that modification and variation may be made without departing from what is regarded to be the subject matter of the invention.

I claim:

1. A process for making a dehydrated protein snack food of desirable texture and chewability from raw protein material including animal meat, poultry, fish, vegetable protein, and all mixtures thereof, comprising the steps of:

(a) cutting a mass of raw protein material while in frozen conditions into thin slices without grinding, (b) thawing the slices of raw protein material at room temperature, (c) intimately admixing the thawed slices of raw protein material and its juices with a flavoring composition to impart a flavor thereto, (d) maintaining the mixture of slices of flavored protein material and its juices at a temperature above freezing and in the absence of entrapped air for a period of time sufficient to achieve thorough penetration of the flavoring composition, (e) freezing the mixture of flavored protein slices and juices into a solid compact mass, (f) cutting the solid mass of flavored protein slices and juices into sections, and (g) dehydrating said sections to a predetermined desired moisture level.

2. A process according to claim 1 wherein the slices of raw protein of step a) have a thickness in the range of 1/16 to ½ inch.

3. A process according to claim 1 wherein during step (b) the temperature of the slices of raw protein material is elevated to within the range of 32° to 50° F.

4. A process according to claim 1 wherein during step (c) the slices of raw protein material and the flavoring composition are tumbled together to thoroughly mix them.

5. A process according to claim 1 wherein during step (d) the slices of flavored protein material are maintained at a temperature above freezing until the flavoring is uniformly distributed therethrough.

6. A process according to claim 1 wherein entrapped air is removed from the slices of flavored protein material.

7. A process according to claim 6 wherein the entrapped air is removed by subjecting the slices to a vacuum.

8. A process according to claim 6 wherein the entrapped air is removed by tamping the slices.

9. A process according to claim 6 wherein the entrapped air is removed by vibrating the slices.

10. A process according to claim 1 wherein during step (e) the pH of the slices of flavored protein material is stabilized in the range of about 5.0 to 6.5.

11. A process according to claim 1 wherein during step (f) the frozen mass of flavored protein material is sliced into sections having a thickness of between about 1/16 and 3/8 inch.

12. A process according to claim 1 including the step of smoking the sections of flavored protein material.

13. A process according to claim 1 wherein during step (g) the sections of flavored protein material are dehydrated at a temperature of between about 140° F. to 400° F.

14. A process according to claim 1 wherein during step (g) the moisture content of the sections of flavored protein material is reduced to between about 10 and 35 percent.

15. A process according to claim 1 wherein the raw protein material is beef meat.

16. A process according to claim 1 wherein the raw protein material is buffalo meat.

17. A process according to claim 1 wherein the raw protein material is deer meat.

18. A process according to claim 1 wherein the raw protein material includes vegetable protein.

19. The product resulting from the process of claim 1.

* * * * *